Figure 1:
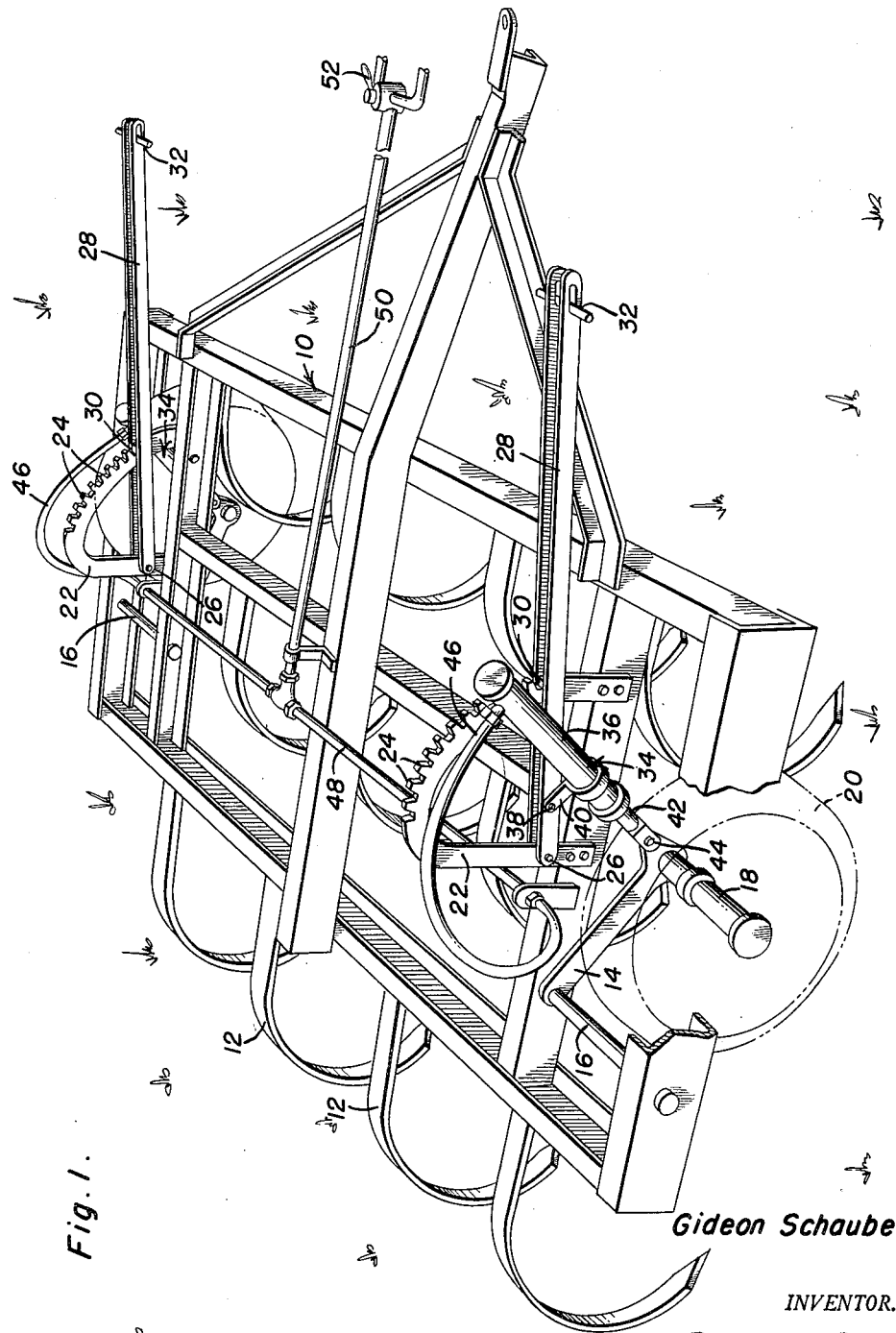

March 13, 1951 G. SCHAUBERT 2,545,111
HYDRAULIC LIFT FOR WHEELED FARM IMPLEMENTS
Filed Jan. 20, 1948 2 Sheets-Sheet 1

Gideon Schaubert
INVENTOR.

March 13, 1951  G. SCHAUBERT  2,545,111
HYDRAULIC LIFT FOR WHEELED FARM IMPLEMENTS
Filed Jan. 20, 1948  2 Sheets—Sheet 2
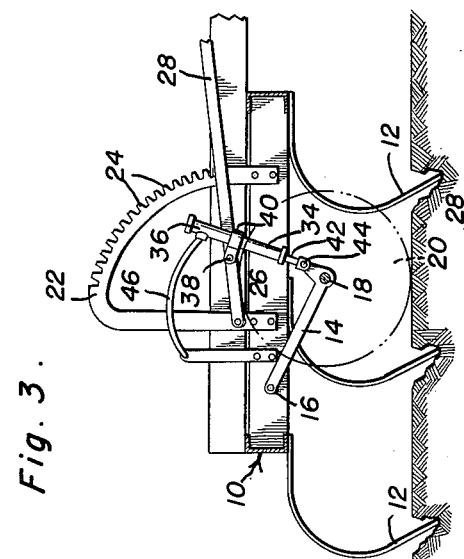
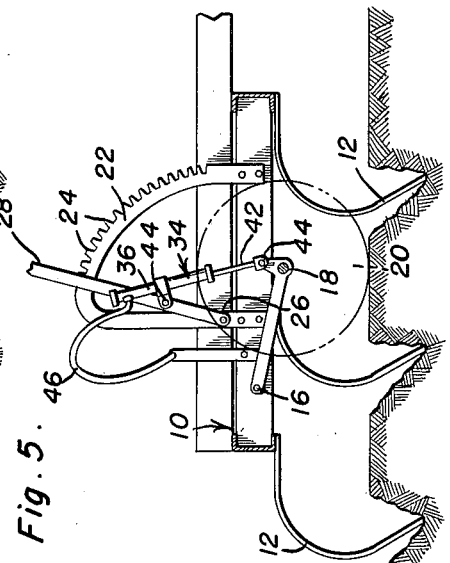
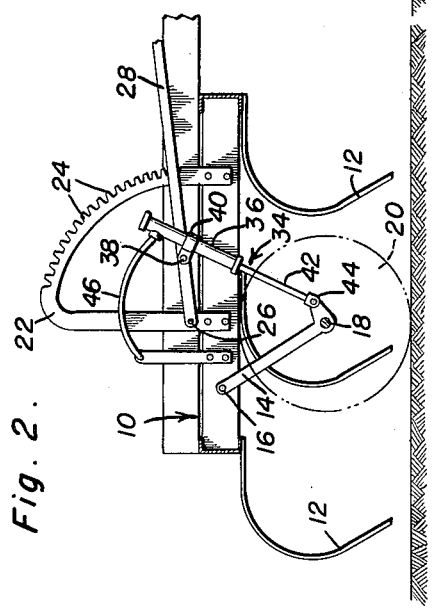
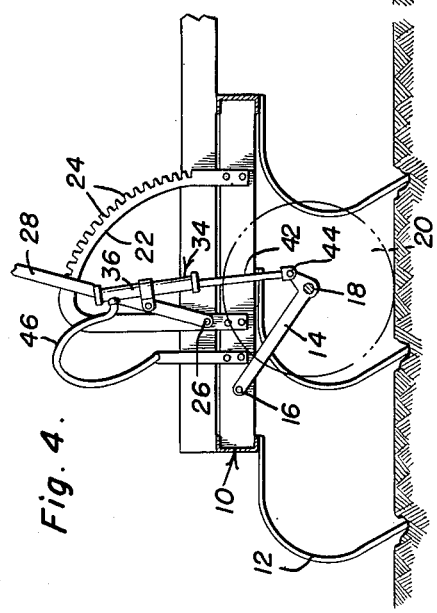
Gideon Schaubert
INVENTOR.

Patented Mar. 13, 1951

2,545,111

UNITED STATES PATENT OFFICE 2,545,111

HYDRAULIC LIFT FOR WHEELED FARM IMPLEMENTS

Gideon Schaubert, Bowdon, N. Dak.

Application January 20, 1948, Serial No. 3,187

1 Claim. (Cl. 97—50)

This invention relates to a lift attachment for wheeled farm implements and has for its primary object to facilitate the raising and lowering of earth-working implements out of and into contact with the ground.

Another object is to enable the operator to set the implement so that the plows or cultivator teeth will enter the ground to a predetermined depth, and then to raise or lower the plows or cultivator teeth at will without altering the depth adjustment thereof.

The above and other objects may be attained by employing this invention which embodies among its features substituting for the link commonly connecting the lever or levers by which the main frame of a cultivator plow or the like is raised or lowered, an extensible link extending between each hand lever and the ground contacting wheels, and common means operable from a position remote from the hand levers for governing the movements of the extensible links for extending or contracting the extensible means, thereby to raise or lower the main frame relative to the supporting wheels thereof.

In the drawings,

Figure 1 is a perspective view of a farm implement showing this invention attached thereto in place of the conventional link of fixed length, Figure 2 is a side view of the device illustrated in Figure 1 showing the hand lever in one extreme position and Figure 3 is a view similar to Figure 2 showing the implement lowered and in earth-working position, Figure 4 is a side view similar to Figure 2 showing the hand lever in the opposite extreme position with the extensible link extended to its fullest extent to elevate the implement frame, and Figure 5 is a view similar to Figure 4 showing the extensible link retracted and the frame lowered.

Referring to the drawings in detail, a main implement frame designated generally 10 has attached to the rear end thereof earth-working implements 12 such as spring cultivator teeth which are adapted to enter the earth to be worked, as will be readily understood upon reference to Figures 3 through 5, inclusive. The frame 10 is supported on lever arms 14 mounted to pivot adjacent opposite ends of the frames on pivot bars 16. The ends of the lever arms 14 remote from those pivotally connected to the bars 16 carry wheel spindles 18 on which conventional frame supporting wheels 20 are mounted to rotate about a common axis. The frame 10 is provided at opposite ends with conventional quadrants 22 each of which is provided with an arcuate row of teeth 24, and pivoted to each quadrant, as at 26, is a hand lever 28 which is equipped with a conventional dog 30 which is adapted to engage in the teeth 24 to hold its respective hand lever in various adjusted positions about its respective quadrant 22. Each hand lever is equipped with a handle 32 by which the dog 30 may be moved out of engagement with the teeth 24 of its respective quadrant so that the lever may be swung about its respective pivot 26. The device so far described is of conventional form, and under ordinary circumstances a link of fixed length is pivotally connected at one end to each hand lever 28 and to an adjacent lever arm 14 so that as the hand levers are swung about their pivots 26, the lever arms 14 will be moved about their respective pivot bars 16 to raise or lower the frame 10 on the supporting wheels 20.

This invention embodies substituting for the links of fixed length extensible links designated generally 34 each of which comprises a cylinder 36 pivotally supported, as at 38, to the hand lever 28 on its respective side of a machine, as by a bracket 40. Operating within each cylinder 36 is a piston to which is coupled one end of a piston rod 42 which moves axially through one end of the cylinder 36 and has its end remote from the piston pivotally coupled, as at 44, to the lever arm 14 on its respective side of the machine. It will thus be seen that the distance between the pivots 26 and 44 may be varied not only by moving the hand lever 28, but also by moving the piston rod 42 within the cylinder 36. In order to effect movement of the piston rod 42 of each cylinder 36, each cylinder is provided adjacent the end remote from that through which the piston rod extends with a port to which is connected a flexible tube 46 by means of which hydraulic fluid is admitted to or extracted from the cylinder 36. The tubes 46 at the opposite ends of the frame 10 are coupled to a cross pipe 48 which in turn is coupled to a hydraulic feed line 50 which leads through a suitable control valve 52 to a source of hydraulic energy carried by a tractor to which the implement is coupled. It will thus be seen that by manipulating the control valve 52, the flow of fluid through the pipe 50 will be governed to cause the piston rod 42 to advance or retract relative to the cylinder 36 and thus move the lift arms 14 about their pivot bars 16 to raise or lower the frame 10.

In use, the frame 10 is coupled in a conventional manner to a conventional farm tractor having a source of fluid or hydraulic energy and the pipe 50 is coupled through the valve 52 to the source of hydraulic pressure. With the frame 10 in lowered position, the hand levers 28 are moved about their pivots 26 to adjust the depth to which the earth-working implements 12 are to enter the ground. After the adjustment has been made, hydraulic fluid is admitted through the pipe 50 into the cylinders 36 to cause the piston rods to advance and swing the lever arms 14 about their pivot bars 16 to cause the frame 10 to lift relative to the supporting wheels 20. The implement may then be transported to the area to be cultivated, and upon manipulating the valve 52 to release the hydraulic fluid contained within the cylinders 36, the frame 10 will return to its lowered position under the influence of gravity. With the frame 10 lowered, the earth-working implements 12 will engage the ground and work to the depth beneath the surface thereof to which they were previously set, and repeated raising and lowering of the frame may be accomplished without requiring a resetting of the hand levers 28 until such time as a different depth of cultivation is to be employed. In this way, a single setting of the depth to which the earth-working implements work will serve irrespective of the number of times that it becomes necessary to raise or lower the frame 10 for the purpose of conveying the implement from one field to another, thus effecting considerable saving in time on the part of the operator of the implement.

While in the foregoing there has been shown and described the preferred embodiment of this invention, it is to be understood that minor changes in the details of construction, combination and arrangement of parts may be resorted to without departing from the spirit and scope of the invention as claimed.

Having thus described the invention, what is claimed as new is:

In a farm implement having a main frame carrying a group of earth-working implements, a pair of lift arms adjacent opposite ends of the main frame, one end of each arm being pivoted to the frame, a ground-contacting wheel mounted on the opposing end of each lift arm remote from that which is pivoted to the main frame, said wheels being rotatable about a common axis and supporting the frame in spaced relation to the ground upstanding two quadrants mounted on the frame adjacent the ends of the frame and the lift arms, a hand lever pivotally secured to each quadrant adjacent the main frame, and a latch on each hand lever for cooperation with an adjacent quadrant in holding its respective lever in various angular positions relative to the main frame, the improvement which comprises a hydraulic cylinder pivoted to each lever, a piston rod extending axially through one end of each cylinder and being connected to an adjacent lift arm for moving said arm relative to the frame and common conduit means for the cylinders mounted on the frame.

GIDEON SCHAUBERT.

REFERENCES CITED

The following references are of record in the file of this patent:

UNITED STATES PATENTS

| Number | Name | Date |
| --- | --- | --- |
| 1,931,815 | Conley | Oct. 24, 1933 |
| 1,991,781 | Bird | Feb. 19, 1935 |
| 2,082,163 | Jeoffroy | June 1, 1937 |
| 2,323,412 | Noble | July 6, 1943 |
| 2,325,855 | Hornish | Aug. 3, 1943 |
| 2,352,281 | Mott | June 27, 1944 |
| 2,413,096 | Barker | Dec. 24, 1946 |